April 20, 1943.  L. E. EYMAN  2,317,043
CREATION OF DESIGN PATTERNS
Filed May 31, 1941

INVENTOR.
Lewis E. Eyman
BY
ATTORNEYS.

Patented Apr. 20, 1943

2,317,043

UNITED STATES PATENT OFFICE 2,317,043

CREATION OF DESIGN PATTERNS

Lewis E. Eyman, Seattle, Wash.

Application May 31, 1941, Serial No. 396,063

3 Claims. (Cl. 35—26)

This invention relates to a device for use in the creation of patterns, and while finding probably its widest usage as an educational article for teaching harmony appreciation, the invention, to mention only one of other apparent applications, might be employed by weavers as a means of obtaining a preliminary visualization of a pattern which is to be worked into a rug or related product.

The invention has for its general object to provide an assembly of strips laid off in variable arrangements of constrastingly marked squares, and a mounting board therefor, the said parts being characterized in that the strips may be selectively applied to the board in a manner creating harmonizing patterns.

It may be here stated that the present invention, to the extent that I employ a series of contrastingly marked squares complemented by other and differently arranged series adapted to be applied in a side-by-side formation, has a surface similarity to the device of U. S. Pat. No. 2,078,646 issued to Leonard R. Treinis April 27, 1937, and constituted of a plurality of cards bordered along an edge of each by a series of variably marked squares, the squares being applied to the several cards in different arrangements and through the instrumentality of stacking one card upon another with the marginal squares exposed, namely in echelon, permitting the user to portray various designs. Aside from a distortion of the portrayed pattern resulting from the stepping of one above another of the exposed series of squares, the border-marked cards of Treinis' patent are objectionable by reason, principally, of the difficulty which is encountered in an attempt to accurately station each as respects the other cards in the set, and the tendency, following placing, for a relative shifting as between the cards which precludes their employment by children of the younger ages.

The invention consists in the novel construction and in the adaptation and combination of parts hereinafter described and claimed.

Figure 3:
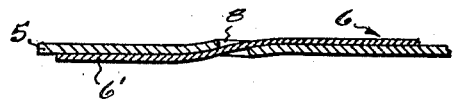
Figure 4:
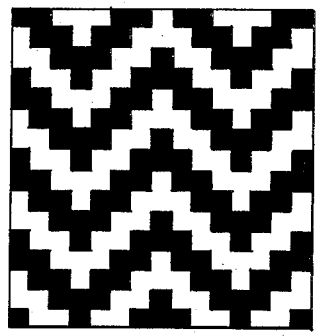
Figure 2:
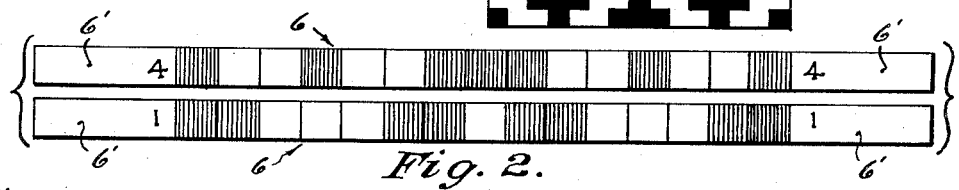
Fig. 2 is a plan view indicating two of the strips detached.
Figure 1:
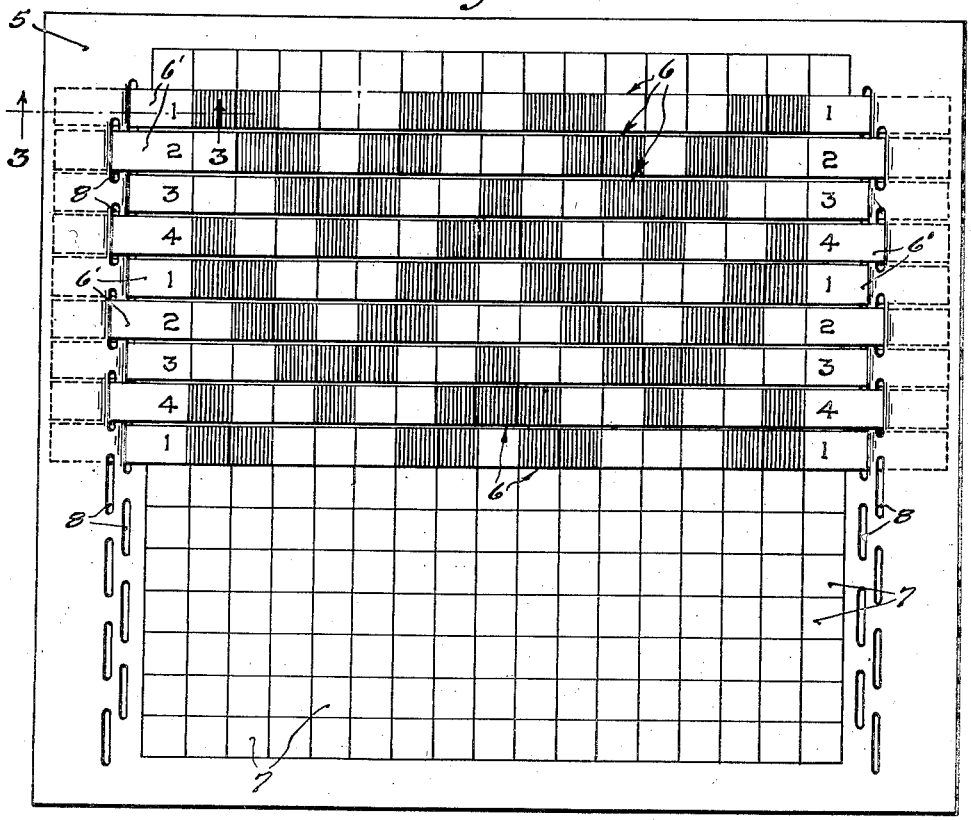
Figure 1 is a top plan view illustrating a mounting board having a plurality of my variably marked strips applied thereto in the course of creating a design.

Fig. 3 is a fragmentary longitudinal vertical section taken to an enlarged scale on line 3—3 of Fig. 1; and Fig. 4 is a reduced-scale representation of the finished design which would be produced by completing the application of cards to the mounting board in the same sequence as shown in Fig. 1, the particular design which I have used for an example being commonly known in the weaving art as a "four harness rose-path" pattern.

Referring to the drawing, the numeral 5 denotes the mounting board of my invention, and 6 the design-portraying strips which are arranged to be applied thereto. These strips are supplied as a set, the board shown in the drawing being one in which the strips therefor would be supplied as a sixteen-strip set. According to the present invention, the board is marked off by a plurality of division lines uniformly spaced in a manner to describe a multiplicity of squares, as 7, lying in transversely and longitudinally extending rows, and provided at each end of the longitudinal rows are slits 8 into which the ends of the strips are arranged to be slipped. The board, as with the strips, is desirably produced from cardboard or an equivalent relatively stiff material, and in cutting the slits I preferably use a die acting to slightly express the outer lip of the slit upwardly and the inner lip downwardly to facilitate insertion of the strip ends 6' while maintaining a sufficient frictional grip to resist end movement of the strip.

The strips themselves are of a length somewhat exceeding the span between complementary slits of the board, and are produced to a width substantially corresponding to the width of the board squares, and on the surface are provided with a succession of contiguous squares dimensionally corresponding to those of the board and these strip squares are variably marked in the manner shown, which is to say by coloring certain of the squares one and the other squares another color. In a sixteen-strip set it is desirable that there be four different arrangements of squares, and to facilitate their application to the board the duplicating arrangements are distinguished by numbers which are applied at the end limits of the squares. For simple designs such as that shown in the drawing the operator applies a selected sequence with three repeats. More complicated designs can be worked out in other manners such, for example, as by reversing the sequences in the successive four-strip groups. It is here pointed out that an arrangement of strips which is more flexible as to its design possibilities than that which is shown is one in which both faces of the strips are marked off in contrastingly colored squares, providing in effect two distinct sets. For distinguishing one from another set, numbering of a higher order is employed on what may be considered the back face than on the front face of the strips.

It is my intention that no limitations be implied excepting as such limitations are necessarily brought into the hereto annexed claims to distinguish from prior knowledge in the art.

What I claim is:

1. A device for creating designs comprising the combination of a mounting board; and a set of parallel-sided strips on each of which are a row of uniform but contrastingly marked squares and which are arranged to be applied, one strip contiguous to another, over the board to have the squares line up in columns both transversely and longitudinally of the board, the set being characterized in that different arrangements are provided as between the contrastingly marked squares of the several strips to permit the portrayal of various block-patterns by the act of changing the sequence in which the different arrangements are applied to the board.

2. A device for creating designs comprising, in combination: a mounting board divided by uniformly spaced lines into a multiplicity of touching squares extending in parallel rows both transversely and longitudinally of the board; and a plurality of matching sets of design-portraying strips of which each set comprises a severalty of strips and wherein each strip is given a width substantially corresponding to the spacing between the board lines to permit each strip to exactly cover one row of the board squares, said strips being divided by transverse lines into square exactly corresponding in shape to the squares of the board and being characterized in that the squares are contrastingly marked to portray a design upon each said strip, the arrangement of the contrastingly marked squares being different for each of the several strips composing a set to permit the portrayal of various patterns upon the board by the act of changing the sequence in which the several strips of a set are applied to the board, the matching nature of the sets permitting the portrayal of a repeat pattern.

3. A device according to claim 2 characterized in that vertical slits are provided in the board at the ends of and in alignment with the respective longitudinal rows of squares arranged to receive the ends of strips which are applied to the board for resisting movement of the latter on the board, said slits being staggered upon the board to permit the ends to be carried beyond longitudinal prolongations of the edge limits of related rows.

LEWIS E. EYMAN.